Feb. 22, 1949.　　　　R. M. STORER　　　　2,462,141
FASTENING DEVICE

Filed Dec. 7, 1943　　　　　　　　　　2 Sheets-Sheet 1

RICHARD M. STORER
INVENTOR.

BY

*A. A. McGrew*

ATTORNEY

Feb. 22, 1949.    R. M. STORER    2,462,141
FASTENING DEVICE

Filed Dec. 7, 1943    2 Sheets-Sheet 2

RICHARD M. STORER
INVENTOR.

BY
*H. A. McGrew*
ATTORNEY

Patented Feb. 22, 1949

2,462,141

UNITED STATES PATENT OFFICE 2,462,141

FASTENING DEVICE

Richard M. Storer, Denver, Colo.

Application December 7, 1943, Serial No. 513,225

8 Claims. (Cl. 24—221.2)

This invention relates to fastening devices, and more particularly to quick-opening fastening devices such as cowling fasteners for airplanes.

A previous type of cowling fastener in widespread use comprises a stud rotatably attached to the cowling, and a relatively heavy special wire attached to the cowling support. The stud is usually fastened by a grommet in a counter sunk or dimpled hole in the cowling, and the shank of the stud is provided with a bayonet slot having a shoulder at its upper end, the slot being adapted to slip over the central portion of the wire which extends across an aperture in the support. Upon rotation of the stud, the wire is pulled up into the slot and is locked in position on the shoulder. Each end of the wire is provided with a coil spring, each coil being attached by a rivet to the support on opposite sides of the aperture.

Such a fastener is not as strong as could be desired, since the load transmitted from the stud to the support, in securing the cowling to the support, is taken directly by the wire, and the strength of the fastener, before deflection occurs, is thereby limited to the load necessary to flex the wire. Thus, the total strength of the fastener is seldom utilized effectively, as the cowling tends to separate from its support upon the imposition of a relatively light load; and the size of the wire must be unduly great to provide greater strength before initial separation of the cowling and its support, or large numbers of the fasteners must be used. Also, due to such separation on light load, the cowling tends to vibrate either directly or sympathetically with other vibrations, set up by the engine, or other causes such as air wave effects in the propeller slip stream. Needless to say, such vibrations produce numerous stress reversals in the stud, as well as the spring and the cowling, tending to produce fatigue failure; particularly at relatively high plane speeds, the cowling may become loose, fly off, or otherwise become damaged.

Further disadvantages of this prior type of fastener include the fact that the wire must have a minimum length to permit the required movement into the bayonet slot and provide sufficient flexibility for ready attachment and detachment. When the corner of the cowling, for instance, is reached, either a shorter wire must be used, or the device placed a relatively considerable distance from the corner. Also, there is a minimum distance from the edge of the support at which the device can be placed to insure effective spring action. Thus, since two rivets are necessary, spaced equal distances on opposite sides of the aperture, the minimum spacing of such devices is sometimes more than the load requirements will permit.

Among the objects of this invention are to provide a device for fastening two parts together which is strong and permits substantially no deflection; to provide such a device in which none of the load transmitted between the two parts is taken directly by a spring or other resilient means; to provide such a device which produces a minimum of air resistance; to provide such a device which may be readily locked and unlocked, as by a simple turn of a stud; to provide such a device which is operable by a simple instrument, such as a screw driver or a coin; to provide such a device in which vibration will tend to tighten the connection; to provide such a device which is relatively simple in construction and which may be varied in design or shape; to provide such a device which may be placed in different positions, such as relatively close to a corner; to provide such a device which may be used interchangeably with the previous type of device generally in use; and to provide such a device which is relatively easy and cheap to manufacture.

Other objects and novel features will become apparent from the description which follows.

In accordance with this invention, a device for fastening two parts together may include a stud rotatably attached to one part and a base attached to the other part, and having a plurality of inclined cam surfaces. A suitable means is provided for engaging the cam surfaces upon rotation of the stud, such as wings extending laterally from the shank of the stud. Also, a suitable means is provided for exerting a pull or producing a torque on the stud or cam surface engaging means, to cause the latter to climb up the cam surfaces and thereby tighten the connection. The foregoing means preferably includes a resilient element, and may also include a cap, fitting over the cam surfaces and rotatable with respect thereto, and also provided with an aperture corresponding in shape to and into which the stud wings fit. The resilient means may comprise a spring attached at one end to the cap and at the other end either to the support or to an arm extending laterally from the base. The spring and cap may also be so designed that in the unlocked position the spring has passed beyond center in one direction, to hold the cap in position to receive the stud upon insertion between the cam surfaces and also to tend to push the stud out of the base. When the cap is moved past dead center toward the locking position, the spring exerts a pull or torque which tends to cause the wings to climb up on the cam surfaces. Other features will become apparent from the following more detailed description of specific embodiments of this invention, taken with reference to the accompanying drawings, in which:

Figure 1:
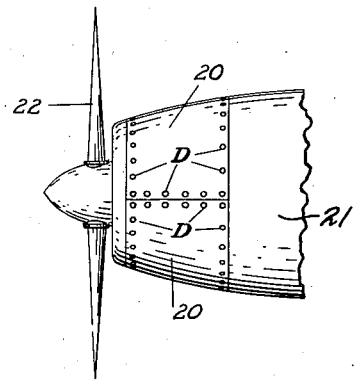
Fig. 1 is a side elevation of an airplane engine cowling, illustrating the use and position of fastening devices of this invention.
Figure 2:
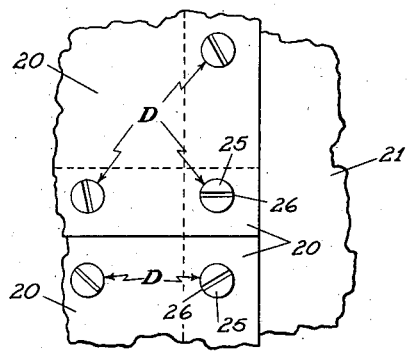
Fig. 2 is a fragmentary plan view of two cowling sections, including the corners at which they meet, and a support to which the cowling sections may be attached by fastening devices constructed in accordance with this invention.

The fastening device of this invention is particularly adapted to secure together two parts, one of which is to be removed and replaced quickly, such as cowling sections 20 of Figs. 1 and 2, which are attached to a support 21 of the engine nacelle of an airplane. The cowling must be removed and replaced quickly in inspecting or repairing the engine, which drives a propeller 22. Fastening devices D, constructed in accordance with this invention, may be utilized in attaching the cowling sections 20 to the support 21.

One embodiment of this invention, illustrated in Figs. 3 to 8, inclusive, includes a base B attached to the inside of the cowling support 21, and a stud S, preferably rotatably attached to the cowling 20. Head 25 of stud S is provided with a slot 26, as in Fig. 2, so that the stud may be turned by any simple instrument, such as a screw driver, coin, the flattened end of a cartridge, or the like. This facilitates the removal of the cowling for inspection or repair purposes, even in far-off places, or after forced landings where complete sets of tools are not available. The stud may be attached to the cowling by a flange 27, peened out from the head against a beveled hole in the cowling, as in Fig. 6, or in any other suitable manner.

Preferably, the device is so constructed that a 90° turn, or less, of the stud will lock the same, since then it is a relatively easy matter for a mechanic to look down a line of cowling fasteners and ascertain by the position of the slots just which ones are fastened and which ones are unfastened. Also, it is sometimes advantageous for the stud to be movable inwardly or outwardly from the cowling—and particularly when a stud must be pushed in before rotation for locking—so that in addition to the angle of the slot, the position of the stud also indicates whether or not a fastener is locked.

Figure 6:
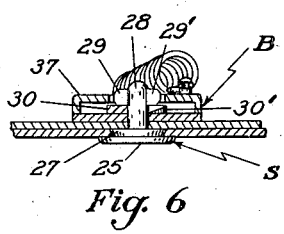
Fig. 6 is a cross section taken along line 6—6 of Fig. 3.
Figure 7:
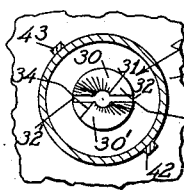
Fig. 7 is a lateral section taken along line 7—7 of Fig. 4, but showing a full lateral section particularly the inclined cam surfaces of the base.

To provide a connection which carries the load directly from the cowling to the support, without the interposition of a spring or resilient element, shank 28 of the stud is provided with a pair of laterally extending wings 29 and 29', which are adapted to engage and move relatively upwardly along a pair of inclined cam surfaces 30 and 30', as in Figs. 6 and 7, attached to or formed integrally with the base B. Wings 29 and 29', as well as the remainder of the stud, are preferably formed by forging or stamping operations.

The wings may be slightly beveled on the under side to rise more conveniently up the cam surfaces, and are preferably sufficiently thick to withstand substantially the same load as the shank. When forged or stamped, the wings normally will be stronger than when machined, because the material flows into the wings during the forging or stamping operation and the grain structure of the metal is not cut, as when the stud is machined, particularly from rolled stock. The stud may be formed of suitable alloy steel or other relatively high strength material, annealed for forging or stamping and heat-treated to produce high strength and wearing qualities of the wings.

Figure 5:
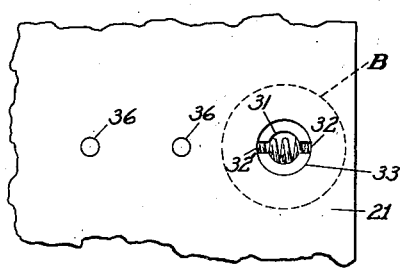
Fig. 5 is a plan view, looking at the outside of the cowling support.

The inclined cam surfaces 30 and 30' are disposed on opposite sides of a hole or aperture 31 in base B; as in Figs. 5 and 7, aperture 31 corresponds in size to the shank of the stud, and has slots or lateral extensions 32 and 32' through which the wings 29 and 29' may pass when the stud is inserted therein. A larger hole 33 is provided in the support 21, so that the base may be disposed in any angular position about the hole 31 and the wings can still be inserted through the base. The inclined cam surfaces may be provided with non-inclined surfaces 34 adjacent their lower ends to provide a stop for the wings. Thus, no forces tending to separate the surfaces being held together can effect a turning of the stud to a point where it will release. Consequently, the only turning movement permitted past the surface 34 requires manual actuation of the head. The cam surfaces rise to a sufficient height so that the support and cowling may always be fastened together tightly without any danger of the wings passing around and dropping off the back side of the cam surfaces. A further safeguard against such an occurrence is provided by a member 43, as in Fig. 7, positioned in the path of a pin 40 limiting the extent of movement of a cap 37, the details of which will be described hereinafter. In addition, the angle at which the cam surfaces are inclined is preferably such that the coefficient of friction between the wings and the cam surfaces will prevent the wings from being pulled back along the cam surfaces, even though a force equal to the strength of the stud is imposed upon the same. The cam surfaces preferably are inclined so that the stud will lock when rotated in a clockwise direction, and will unlock when rotated in a counter-clockwise direction, in the same manner as a righthand screw.

Base B may be provided with a laterally extending arm 35 (Figs. 3 and 4) for attaching the same to the support 21, as by rivets 36. Base B, including the inclined cam surfaces, may be formed by a stamping operation or the like, as in a multi-stage transfer press, a dieing machine, or the like. The base may be formed of a magnesium aluminum alloy or other lightweight material, or heavier material, if desired.

To maintain the stud in locked position—and also to urge the wings relatively upwardly along the cam surfaces so as to tighten the connection between the cowling and support, particularly during vibration—a cap 37 and a toggle spring 38 are provided. The cap 37, which may be stamped out of light-weight material, is mounted on base B between ears 42 and 43 for rotation about the center of the cam surfaces, and is provided with an aperture 39 corresponding in shape to the shank 28 and wings 29 and 29' of the stud S. Thus, when the stud S is pushed through the aperture 31, 32 in the base B, the wings 29 and 29' engage the sides of the aperture 39 in the cap 37 as they begin to move upwardly along the inclined cam surfaces. One end of the spring 38 is attached to a pin 40 on cap 37, while the opposite end of the spring 38 is attached to an ear 41 formed adjacent the end of arm 35. The length of arm 35 is thus usually determined by the length of spring necessary. The cap may be held on the base by a front ear 42 formed on the base, which acts also as a stop for the unlocked off-center position of the spring, and a similar rear ear 43, as in Fig. 7, also acting as a stop for pin 40 in the manner previously described.

Figure 3:
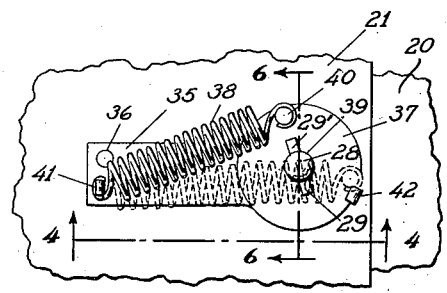
Fig. 3 is a bottom plan view of a fastening device constructed in accordance with this invention, looking at the base and the under side of the support and cowling, said device being shown in locked position with the unlocked position being shown in dotted lines.
Figure 4:
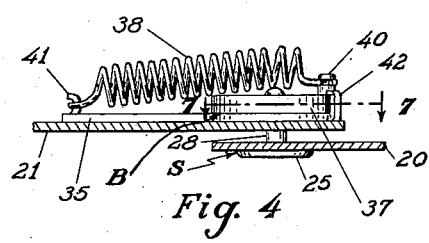
Fig. 4 is a longitudinal section taken along line 4—4 of Fig. 3, but with the device shown only in unlocked position.

As in Fig. 3, the toggle spring 38 in the full position, or in any position counter-clockwise from its center line, exerts a pull on the cap or produces a torque on the stud which not only maintains the wings upon the cam surfaces, but also tends to tighten the connection. When the stud is moved to the unlocking position, the spring is moved to the dotted position of Fig. 3 directly over the end of shank 28 of the stud, thereby tending to push the shank out of the base. At the same time, pin 40 moves past the center line, and maintains the spring in an off-center position until the stud is again inserted in the base and turned slightly to pull the pin back past center, whereupon the spring will pull the stud and wings into locking position. Normally, of course, the stud is turned to the full locking position by the mechanic.

In disassembling cowling attached to a support by fastening devices constructed in accordance with this invention, it is necessary only to insert a suitable instrument of the type previously described into the slot in the head of the stud of each device, and turn the stud in a counter-clockwise direction, through 90°, more or less, to move the stud to the unlocked position. There, the spring 38 will tend to push the stud out of the base, and the stud will remain in the unlocked position, since the cap and spring will have been thrown to the unlocked off-center position. When all the fastening devices for a section of cowling have been unlocked, the cowling section may be removed to obtain access to the engine or other part requiring inspection or repair.

After inspection or repair is completed, each cowling section may in turn be placed in position on or against its support. Then, the stud of each fastening device is pushed inwardly against the spring, after a slight turn if necessary to locate the wings 29 and 29' so they will pass through slots 32. When a stud has been pushed in to its limit, it is turned in a clockwise direction, the same as a righthand screw, through a sufficient angle, 90°, more or less, to lock the cowling to the support. If any fastening device is not tightened by the mechanic, spring 38 will pull it tight. Thus, all that is necessary for the mechanic is to turn the stud enough so the spring and cap will snap past center, from the unlocked to the locked position. As explained previously, reliance normally will not be placed on the spring to lock the device, but the spring comprises a safeguard against inadvertent insufficient tightening.

Figure 8:
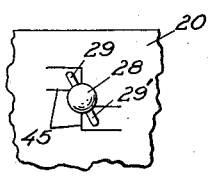
Fig. 8 is a plan view, looking at the under side of the cowling and illustrating one manner of attaching the stud to the cowling.

Alternatively, the stud may be secured to the cowling by first punching out a pair of ears, such as along lines 45 of Fig. 8, on opposite sides of a hole drilled to accommodate the shank 28 of the stud. After the wings 29 and 29' have been inserted through the apertures provided by the ears, the ears are punched back into the cowling. This attaches the stud securely to the cowling, but permits relative movement inwardly and outwardly of the cowling, when the stud is in the unlocked position. The freedom of movement of the stud which is thereby obtained is of particular benefit when a spring is utilized which pushes the stud out of the base in the unlocked position, since such springs will cause studs of unfastened devices to protrude from the cowling, thereby more quickly calling attention of a mechanic to the unfastened devices.

In a second embodiment of this invention, as illustrated in Figs. 9 to 13, inclusive, a circular base B' is provided with inclined cam surfaces 30 and 30', as before, and also a hole 31 and slots or lateral extensions 32 and 32' to accommodate the wings 29 on a shank 28' of the stud S'. Stud S' may be attached to the cowling in the manner shown in Fig. 8, and described above. Base B' is provided with a rim or flange 50 which, for attachment purposes, is punched or formed over onto the opposite side of the support, as in Figs. 10 and 11. The base is also countersunk on a bevel forming a conical surface 51, as in Fig. 10, to guide the wings more accurately into slots 32 and 32'.

A cap 37' is mounted for rotation about the circular base, lower edge 52 of the cap being bent inwardly to form a cooperating tongue and groove connection 52' with the periphery of the base. The side wall of the cap may be divided into a number of sections, such as four, so that it may more readily be bent over and against the base. The top of the cap is provided with an aperture 39' which conforms in shape to and is adapted to receive the shank 28' and wings 29 and 29' of the stud, so that springs 38 may produce a torque tending to pull the wings relatively upwardly along the inclined cam surfaces. The head 25 of the stud is provided with a slot, as before, so that the stud may be turned by any suitable instrument.

Figure 9:
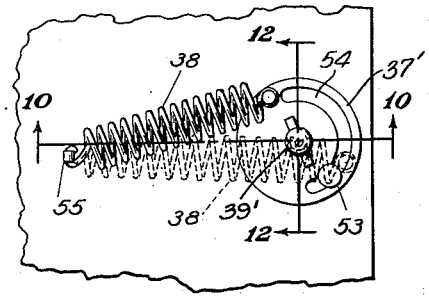
Fig. 9 is a bottom plan view of a fastening device constructed in accordance with this invention, and forming a second embodiment thereof, unlocked position being shown in dotted lines.
Figure 10:
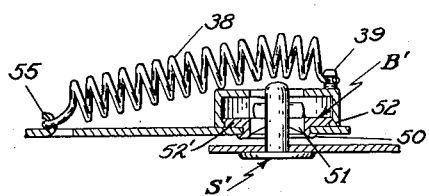
Fig. 10 is a longitudinal section taken along line 10—10 of Fig. 9, the device being shown in unlocked position.
Figure 11:
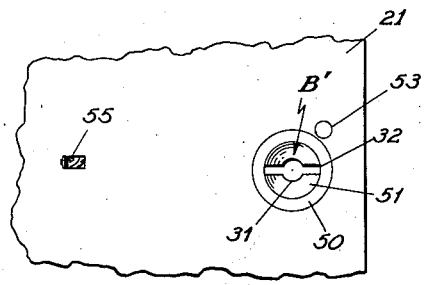
Fig. 11 is a plan view, looking at the top of the cowling support.
Figure 12:
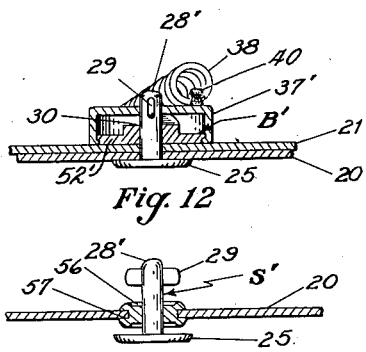
Fig. 12 is a cross section taken along line 12—12 of Fig. 9.

To provide a stop for the cap in its turning movement, and also to provide a second point of attachment of the base to prevent rotation thereof, a pin 53, as in Figs. 9 and 11, extends through the base and is riveted to the cowling support. Pin 53 extends through an arcuate slot 54 in the top of the cap, so that movement of the cap will be limited by contact of the ends of the slot with the pin. The pin also guides the cap during rotation, and the head of the pin extends outwardly over the edges of the slot to assist in maintaining the cap in the desired position.

One end of spring 38 is attached to a pin 40 on the cap, as before, but the opposite end of the spring is attached to an ear 55, bent up from support 21. As before, when the spring is in the full position of Fig. 9, it will exert a pull on the cap, or produce a torque on the stud which tends to tighten the connection by causing the wings to climb upwardly on the inclined cam surfaces. Also, when the stud is moved to the unlocked position, the spring will move to the dotted position of Fig. 9, there overlying the stud and tending to push the stud out of the base, as in Fig. 10. This provides a faster and readier disconnecting action, particularly when there are numerous fasteners for one cowling section.

Figure 13:
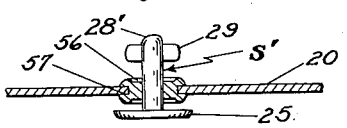
Fig. 13 is a cross section of the stud and cowling, illustrating another manner of attaching the stud to the cowling.
Figure 14:
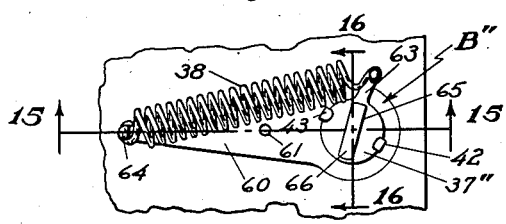
Fig. 14 is a bottom plan view of a fastening device constructed in accordance with this invention and forming a third embodiment thereof.
Figure 16:
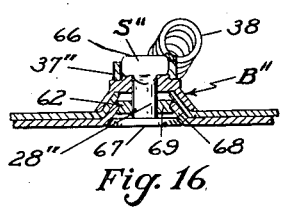
Fig. 16 is a cross section taken along line 16—16 of Fig. 14.
Figure 15:
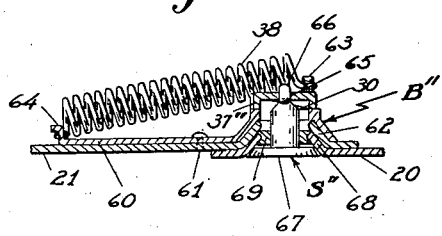
Fig. 15 is a longitudinal section taken along line 15—15 of Fig. 14, but with the device in unlocked position.
Figure 17:
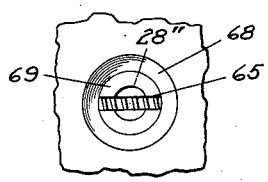
Fig. 17 is a plan view looking at the under side of the cowling and illustrating another manner of attaching the stud to the cowling.

A further alternative manner of fastening the stud to the cowling is illustrated in Fig. 13, wherein a grommet 56, split if necessary for passage over wings 29 of stud S', is provided with a peripheral groove 57. A section of the cowling surrounding a hole through which the stud passes is dimpled so that the wings and one rim of the grommet will pass through. The cowling then is punched to force the dimple back into alignment with the rest of the plate, thereby engaging the groove in the grommet and rotatably securing the stud to the cowling with longitudinal movement between the wings 29 and 29' and the head 25 of the stud permitted in unlocked position.

In a third embodiment of this invention, as illustrated in Figs. 14 to 17, inclusive, a base B" is provided with a tapered, laterally extending arm 60, which varies in cross section similarly to a cantilever beam. Arm 60 is provided with a hole for a rivet 61, which may be spaced from the hole 33 in the support corresponding to the distance of one of the rivets of the wire and stud type of fastener mentioned previously. The base B" is formed to fit over a dimple 62, which is pressed or punched outwardly from the cowling support to provide a second point of attachment for the base, thereby preventing the base from turning relatively to the support.

The base is provided with an upstanding portion carrying the inclined cam surfaces 30, and also with ears 42 and 43 adapted to hold the cap 37" in position and act as stops for an arm 63 which is preferably formed integrally with the cap and extends outwardly therefrom to provide a relatively long torque arm for spring 38. An aperture 65 in cap 37" corresponds in shape to and accommodates flattened end 66 of stud S". The flattened end of the stud extends laterally from shank 28" thereof, and provides wings for engaging the cam surfaces. The aperture in the base is similar to the aperture 31 in the base of the other modifications, since the shank enters this aperture when the stud is inserted within the base.

The stud S" may be formed by forging, swaging, or other suitable operations, and is provided with a button-type head 67 having a slot therein for turning the stud. The flattened end 66 of the stud may be found to be somewhat simpler to form than the wings 29 of the studs S and S'.

The stud S" may be attached to the cowling in any suitable manner, such as previously described. However, to provide a flush surface which produces a minimum of air resistance, head 67 is beveled to fit into a dimple 68 in the cowling. The stud is also preferably rotatably attached to the cowling so as to be movable inwardly and outwardly thereof, as by a grommet 69 of any suitable type, inserted within the rim of dimple 68. The grommet may be of a split spring type, adapted to snap over the flattened end 66 of the stud, and then snap into engagement with the rim of the dimple.

From the foregoing, it will be evident that a fastening device constructed in accordance with this invention is strong and permits substantially no deflection, since the wings provide a direct connection between the stud and the base. Thus, no load is transmitted directly between the cowling and its support through a spring or other resilient means. Also, instead of tending to loosen the fastening, vibration tends to tighten it, since springs 38 will tend to pull the stud tighter. Furthermore, the device is readily locked and unlocked, and by any simple instrument, such as a screw driver, coin, or flattened end of a cartridge.

A fastening device constructed in accordance with this invention is composed of parts which are readily and cheaply made. The base and cap of each of the embodiments may be made by simple stamping operations, as on a multiple punch press, a transfer press, or a dieing machine, while the studs may be made by simple stamping or forging operations.

A fastening device of this invention is light in weight, yet strong, as the materials of which the parts are made may be varied as desired. The caps, particularly, may be made of light-weight material, while the respective bases may also be made of light-weight material, provided, of course, that the inclined cam surfaces will sufficiently resist wear. For the latter purpose, it may be necessary to heat treat the base after forming, to harden the cam surfaces. Such hardening can be carried out in batch operations, in furnaces or the like, or, if desired, flame hardening or other localized surface hardening may be utilized in treating only the cam surfaces. Such localized surface hardening reduces the tendency for distortion during hardening, and thereby maintains the accuracy of the manufacturing operation in the finished product.

As indicated previously, the studs are preferably formed of relatively high strength material. Preferably, a steel or alloy is used which can be readily worked to produce the head and wings or flattened end of the stud, and then heat treated so as to become relatively hard and increase the tensile strength.

The springs are, of course, made of spring wire stock, and may be varied in size, length and other properties as necessary. However, the strength of the springs need not be nearly so great as the main wire or spring of the fastener previously in use, so that on the basis of weight, the springs contribute only a fraction of the weight to the device that the wire of the previous type of fastener contributes.

The cowling fastener of this invention is readily installed. The first and third embodiments may be attached to the cowling and support in the field or repair shop, since only simple tools are needed to rivet the arm to the support, or to dimple the support or cowling. Furthermore, as will be evident from Fig. 2, a fastener constructed in accordance with this invention is readily installed close to the edge of the cowling and is particularly easy to install in a corner, such as corners 70.

The base may be installed relatively close to the corner. The arm of the first or third embodiment, for instance, may extend diagonally away from the corner, or parallel to one of the edges of the corner, or in substantially any other desired radial position about the aperture, except that it shou'd not be too close to the edge of the support. In the first embodiment of the invention, the two rivets attaching the arm to the support are in line and on the same side of the aperture, which permits the base to extend relatively close to the corner and the aperture in the support to be positioned correspondingly. In the second embodiment of the invention, the pin which forms the second point of attachment for the base and also assists in holding the cap on the base and further provides a stop for the cap, is attached to the support at a point relatively close to the aperture, and therefore lies within the diameter of the base. In the third embodiment of the invention, the space between the aperture and the rivet attaching the arm to the support corresponds to the spacing of one rivet of the fasteners previously in use, but only on one side of the aperture.

In the second embodiment of the invention, the ear bent up from the support for attachment of the rear end of the spring, for a single fastener, may be disposed at any desired point radially from the aperture, within the confines of the support, as well as the arms 35 and 60, of the first and third embodiments, respectively. However, for a number of fasteners in line, the slot in the head of each stud is preferably disposed in line with the wings, and also so positioned that each slot will be perpendicular to the line of fasteners in the unlocked position, but all of the slots will be in line when in locked position. The desired locked and unlocked positions of the stud normally determine the position of the cam surfaces, and this, in turn, determines the position of the stop pin and of the ear, since the ear and the pin are normally disposed between 120° and 180° apart about the aperture. Thus, the ears 41, 55, and 64 will lie along a line parallel to the line of apertures, with the springs extending therebetween.

Although three embodiments of this invention have been illustrated and described in some detail, it will be evident that changes may be made in each of the embodiments. For instance, any of the alternative manners of attaching the stud to the cowling may be utilized in any of the embodiments. Also, any of the types of studs described may be utilized with any of the bases, as well as any of the caps. The materials of which the parts are made may be varied considerably, in view of weight and strength requirements for various applications. The device may be made so as to be interchangeable with the previous type of fastener described, or to require only an additional rivet hole. Also, more than two parts may be secured together by a fastening device or devices of this invention.

The methods of manufacturing the various parts may be varied from those described. For instance, the stud may be machined instead of forged or swaged. Also, the parts may be made up by joining together component parts, as by welding, brazing or the like. The size and shape of the various parts may also be varied within considerable limits.

Various other changes may be made therefrom, such as utilization of a pair of arms, one extending a short distance from the base and the other extending a greater distance from the base, with the springs 38 attached to the longer arm. Also, such arms may be at right angles when the device is to be installed in a corner.

Instead of a coil spring, a leaf or spiral spring may be utilized in some instances for exerting a pull on the cap or producing a torque on the stud, although in the latter instances the function of the spring in tending to push the stud out of the base when in the unlocking position, may have to be dispensed with. For large installations, hydraulically operated resilient means may be substituted for the spring 38, and the function of pushing the stud out of the fastener in the unlocking position may be performed by a cam or the like.

From the above, it will also be apparent that embodiments other than those described or indicated may exist, and that further changes may be made without departing from the spirit and scope of this invention.

What is claimed is:

1. A device for fastening a pair of plates or the like together, comprising a circular base adapted to be attached to one plate, said base having a central aperture and axially inclined cam surfaces surrounding said apertures; a pin adapted to be attached to said base adjacent the periphery of said base; a cap rotatable about said base and provided with an arcuate slot through which said pin extends, to limit rotation of said cap, said cap being adapted to cooperate with a stud having a plurality of wings adapted to extend through the aperture in said base and to engage the aperture in said cap, for engaging said cam surfaces upon rotation of said stud; and a spring tending to rotate said cap and said wings and thereby pull said wings upwardly along said cam surfaces, to tighten the connection between said plates, one end of said spring being attached to said cap adjacent an end of said slot, and the other end of said spring being adapted to be attached to said first plate.

2. In a device for fastening two parts together, inclusive of a stud adapted to be rotatably attached to one of said parts, a base adapted to be attached to the other of said parts, and elements on said base adapted to inter-engage elements on the stud for fastening said parts together, the connection being tightened upon rotation of said stud in a pre-determined direction, the improvement which comprises turning means for engaging said stud inter-engaging elements to turn said stud; and resilient means fixed at one end with respect to the base and secured at the other end to said turning means for moving said turning means and stud in a direction to tighten such connection, and movable to a position past the center of rotation of the turning means wherein said turning means tends to be moved in the opposite direction by said resilient means.

3. In a device for fastening two parts together, as defined in claim 2, wherein said resilient means comprises a spring, one end of which is attached to said base and the other end attached to the turning means.

4. In a device for fastening two parts together, inclusive of a stud adapted to be rotatably attached to one of said parts and having laterally extending wings, and a base adapted to be attached to the other of said parts and having cam surfaces adapted to be engaged by said wings for fastening said parts together, the connection being tightened upon rotation of said stud in a predetermined direction, the improvement which comprises a cap having slots for engaging said stud wings and rotatably mounted on said base; and a toggle spring fixed at one end with respect to the base having the other end connected to said cap for turning said cap and stud in a direction to tighten such connection, said spring when turned in the opposite direction past a neutral position tending to move said cap in the opposite direction.

5. In a device for fastening two parts together, as defined in claim 4, including stops for limiting the rotation of said cap in each direction.

6. A device for fastening two parts together, comprising a base adapted to be attached to one part and having a plurality of inclined cam surfaces, said base being adapted to cooperate with a stud rotatably attached to the other part and having laterally extending wings adapted to engage said cam surfaces and thereby fasten said plates together, said base being provided with an aperture having lateral extensions through which said wings may pass; a rotatable cap having a corresponding aperture adapted to engage said wings; and resilient means acting on the cap for producing a torque upon said cap to pull said wings along said cam surfaces and also mounted so as to be moved past a dead center position to retain said cap in a stud receiving position when said stud is withdrawn.

7. A device for fastening a pair of parts together, comprising a base adapted to be attached to one part and having a plurality of inclined cam surfaces, said base being adapted to cooperate with a stud rotatably attached to the other part and having laterally extending wings adapted to engage said cam surfaces to fasten said plates together, said base being provided with an aperture corresponding to said stud and wings to permit passage therethrough so that said wings may engage said cam surfaces upon rotation of said stud; a rotatable cap mounted on the base and having an aperture corresponding to and adapted to receive said wings and be connected to the stud for rotation therewith; and a toggle spring fixed at one end with respect to the base and secured at the other end to said cap for exerting a torque upon said cap to pull said wings upwardly along said cam surfaces in the locking position, said spring also being mounted so as to push said stud away from said base when in the unlocking position.

8. A device for fastening a pair of parts together, a base adapted to be attached to one part and having an arm extending therefrom, said base being adapted to cooperate with a stud rotatively secured in the other part through inter-engaging means including portions on said stud and base for fastening said parts together upon rotation of said stud; said base also having a rotatable stud engaging member mounted thereon, a spring attached at one end to the outer end of said arm and at the other end to the rotatable stud engaging member, said spring being disposed to cause the connection between said parts to be tightened, said rotatable member and spring being movable, as said inter-engaging means are unlocked, to a neutral position wherein said spring tends to maintain said means in such position.

RICHARD M. STORER.

REFERENCES CITED

The following references are of record in the file of this patent:

UNITED STATES PATENTS

| Number | Name | Date |
|---|---|---|
| 1,351,695 | Schreeder | Aug. 31, 1920 |
| 1,493,781 | Kennedy | May 13, 1924 |
| 1,594,776 | Hagger | Aug. 3, 1926 |
| 1,639,043 | Malouf | Aug. 16, 1927 |
| 1,766,988 | Farr | June 24, 1930 |
| 1,890,244 | Barrett et al. | Dec. 6, 1932 |
| 2,306,928 | Bedford, Jr. | Dec. 29, 1942 |
| 2,306,967 | Mack | Dec. 29, 1942 |
| 2,309,732 | Johnson | Feb. 2, 1943 |
| 2,309,737 | Murphy | Feb. 2, 1943 |
| 2,334,680 | Murphy | Nov. 16, 1943 |
| 2,337,483 | Marty | Dec. 21, 1943 |
| 2,339,591 | Weber | Jan. 18, 1944 |